United States Patent [19]

Schenk

[11] Patent Number: 4,987,873
[45] Date of Patent: Jan. 29, 1991

[54] METHOD FOR THE DYNAMIC CORRECTION OF THE IGNITION POINT OF AN INTERNAL COMBUSTION ENGINE

[75] Inventor: Jürgen Schenk, Albershausen, Fed. Rep. of Germany

[73] Assignee: Daimler-Benz AG, Fed. Rep. of Germany

[21] Appl. No.: 412,481

[22] Filed: Sep. 26, 1989

[30] Foreign Application Priority Data

Sep. 26, 1988 [DE] Fed. Rep. of Germany ....... 3832629

[51] Int. Cl.$^5$ ............................ F02P 5/04; F02P 5/06; F02P 5/14
[52] U.S. Cl. .................... 123/418; 123/421; 123/422
[58] Field of Search ................ 123/418, 421, 422, 423

[56] References Cited

U.S. PATENT DOCUMENTS

| | | | |
|---|---|---|---|
| 4,626,997 | 12/1987 | Takeda et al. | 123/422 |
| 4,658,789 | 4/1987 | Morita | 123/422 |
| 4,710,881 | 12/1987 | Mouri et al. | 123/422 |
| 4,712,527 | 12/1987 | Staerzl | 123/422 |

Primary Examiner—Tony M. Argenbright
Assistant Examiner—Robert E. Mates
Attorney, Agent, or Firm—Evenson, Wands, Edwards, Lenahan & McKeown

[57] ABSTRACT

In a characteristic-diagram ignition of an internal combustion engine, knocking should be avoided even if there is a sudden change in load or speed. For this purpose, a correction value in the "retard" direction, the amount of which is dependent both on the intake air temperature and on the engine speed, is superposed on the characteristic-diagram ignition point determined. After the retardation has been carried out, the correction value is adjusted within a selectable time in the "advance" direction until the instantaneously valid characteristic-diagram ignition point is reattained.

3 Claims, 1 Drawing Sheet

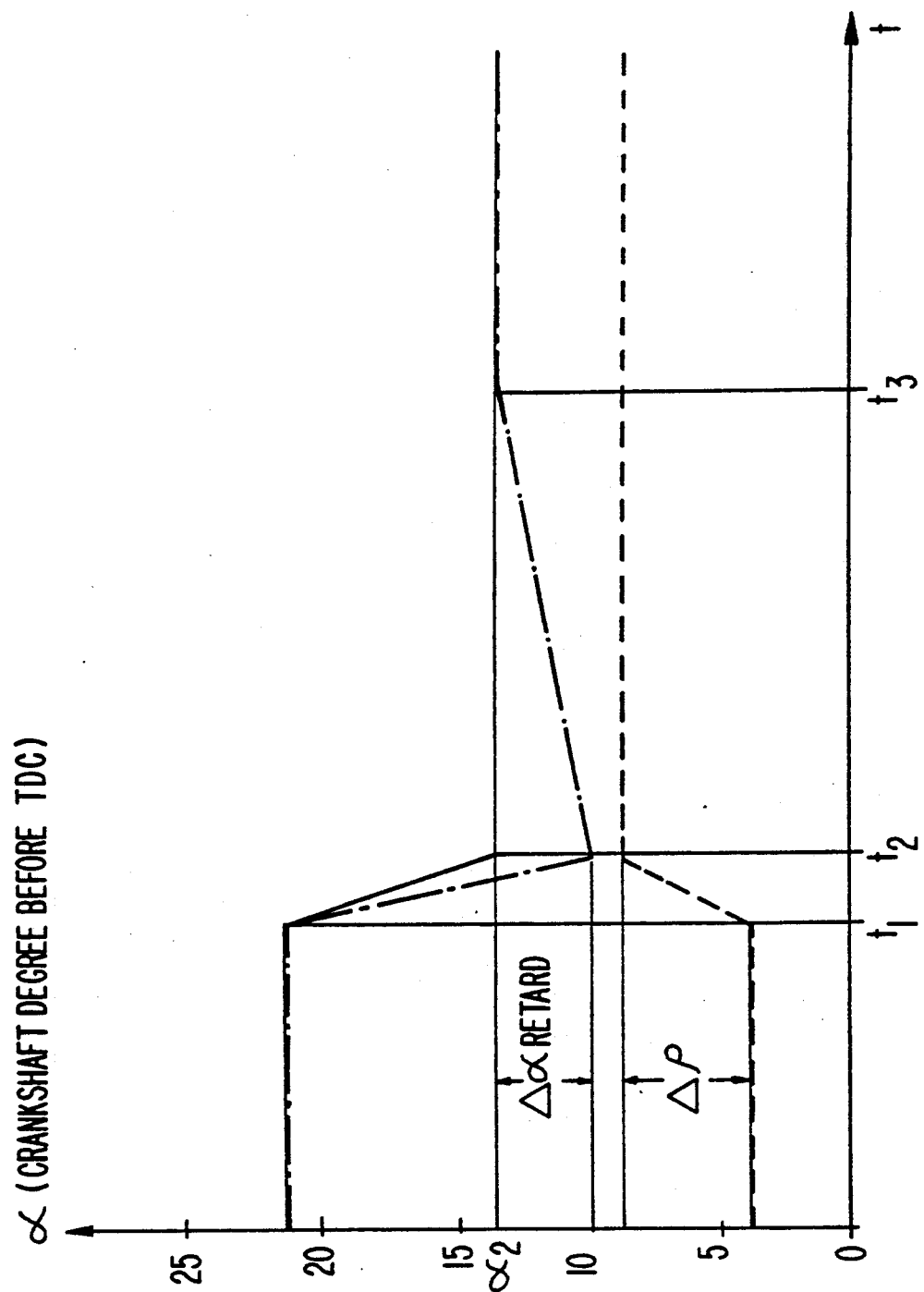

METHOD FOR THE DYNAMIC CORRECTION OF THE IGNITION POINT OF AN INTERNAL COMBUSTION ENGINE

BACKGROUND AND SUMMARY OF THE INVENTION

The invention relates to a method for the dynamic correction of an ignition point of an internal combustion engine having characteristic-diagram ignition as a function of intake tube pressure, intake air temperature and engine speed.

In internal combustion engines with electronic ignition, it is customary to record the ignition point in a characteristic diagram against the load and the engine speed In this way, an appropriate ignition point for the respective engine speed and for the load, e.g. an ignition point optimized for exhaust gas and consumption values, is taken from the characteristic diagram. Thus, for example, for idling an "early" ignition point is selected, which stabilizes idling by an increase in the torque, while for full-load operation an ignition point is selected which takes account of the knock border line.

Although such methods are suitable for the steady-state behavior of internal combustion engines, they have the disadvantage that the dynamic processes at the internal combustion engine, such as for example load and speed changes, are not adequately taken into account.

It is an object of the invention to correct ignition points determined from the characteristic diagram in such a way that optimized ignition points are available for the dynamic operation of the internal combustion engine.

The object is achieved according to the invention by providing a method wherein, if a predetermined intake tube pressure change (Δp) is exceeded, a correction ignition point ($\Delta\alpha_{retard}$) acting in the "retard" direction is superimposed within a selectable time ($t_2-t_1$) on the instantaneously valid characteristic-diagram ignition point ($\alpha_2$), and wherein the correction ignition point ($\Delta\alpha_{retard}$) is then adjusted within a freely selectable time in the "advance" direction to the valid characteristic-diagram ignition point ($\alpha_2$).

In certain preferred embodiments the correction ignition point )$\Delta\alpha_{retard}$) is a function of intake air temperature ($\theta_{air}$) In certain preferred embodiments the correction ignition point ($\Delta\alpha_{retard}$) is a function of the engine speed(n).

A sudden change in the operation of the internal combustion engine, i.e. a load change or a speed change, is detected via a jump in the intake tube pressure. Such a change can lead to knocking, in particular in the case of the changeover to full load and at high intake air temperatures. Although, in this case, the ignition point is matched to this operating state via the characteristic diagram, knocking can nevertheless occur due to the sudden load alteration under unfavorable conditions. In order to avoid knocking in all cases, a correction ignition point in the "retard" direction is superposed on the instantaneously valid characteristic-diagram ignition point. This correction value is selected so that knocking is reliably ruled out. The amount of the correction value is here a function of the intake air temperature and of the engine speed. Following this retardation of the ignition point, the correction value is reversed within a freely selectable time in the "advance" direction until the valid characteristic-diagram ignition point is reached.

Other objects, advantages and novel features of the present invention will become apparent from the following detailed description of the invention when considered in conjunction with the accompanying drawings.

BRIEF DESCRIPTION OF THE DRAWING

The single drawing figure is a diagram depicting the ignition point $\alpha$ before the top dead center (TDC) of the crankshaft plotted in the ordinate in degrees against the time axis.

DETAILED DESCRIPTION OF THE DRAWING

Let it be assumed that the intake tube pressure, likewise represented in this diagram (by a dashed line) but without a quantity indication, suddenly increases at time $t_1$. Without any dynamic correction, the ignition point changes in accordance with the values recorded in the characteristic diagram, as indicated by the solid line, i.e. it is adjusted by a certain amount in the "retard" direction. However, despite the retardation, the sudden change in the manner in which the engine is operating could lead to knocking.

According to the method according to the invention, when a certain intake-tube pressure change $\Delta_p$ is exceeded, a correction value $\Delta\alpha_{retard}$ in the ignition-retardation direction is superimposed within a freely selectable time $t_2-t_1$ on the characteristic-diagram ignition point $\alpha_2$ determined for the ignition point $t_2$, said correction value preventing knocking combustion in all cases. This correction value $\Delta\alpha_{retard}$ is a function of the time t and dependent on the intake air temperature $\theta_{air}$ and on the crankshaft speed n. Since the tendency to knock increases with higher air temperature, $\Delta\alpha_{retard}$ increases with higher air temperature $\theta_{184}$. Conversely, $\Delta\alpha_{retard}$ decreases with higher speed n since it can be assumed that a high speed also brings about better cooling, i.e. reduction of the intake air temperature $\theta_{air}$. In addition, by means of a decreasing evaluation of $\Delta\alpha_{retard}$ as the speed n increases, the electronic control unit, which at higher speeds may come up against its runtime limits due to the increased amount of computation, can be relieved Thus, for example provision can be made that $\alpha_{retard}$ is no longer influenced from a speed of about 4000–5000 revolutions per minute onwards The ignition point having been corrected in the "retard" direction in this way, it is adjusted in the "advance" direction with a selectable gradient, i.e. within a selectable time until at time $t_3$ the instantaneously valid characteristic-diagram ignition point $\alpha_2$ for the operation of the internal combustion engine is reached, i.e. until $\Delta\alpha_{retard}=0$. The entire correction procedure can accordingly be summarized in the following equation:

$$\Delta\alpha_{retard}(t)=f(\theta_{air})*f(n)*(1-(\Delta\alpha_{advance}*t)/\Delta t).$$

$(\Delta\alpha_{advance}*t)/\Delta t$ thus determines the manner in which the retardation $\Delta\alpha_{retard}(t)$ is reversed again. The valid characteristic-diagram ignition point is reached when $\Delta\alpha_{retard}=0$ or $(\Delta\alpha_{advance}*t)/\Delta t=1$. This progression according to the invention of the ignition point with dynamic correction is represented by a chain-dotted line.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method for dynamic corrections of an ignition point of an internal combustion engine, comprising the steps of:
    providing a characteristic-diagram ignition of a function of intake tube pressure, intake air temperature and engine speed,
    superimposing within a selectable time on an instantaneously valid point of the characteristic-diagram ignition a correction ignition point acting in a retard direction after a predetermined intake tube pressure change has been exceeded, and
    adjusting the correction ignition point within a freely selectable time in an advance direction to the valid characteristic-diagram ignition point,
    wherein the correction ignition point is a function of intake air temperature.

2. Method for dynamic corrections of an ignition point of an internal combustion engine, comprising the steps of
    providing a characteristic-diagram ignition as a function of intake tube pressure, intake air temperature and engine speed,
    superimposing within a selectable time on an instantaneously valid point of the characteristic-diagram ignition a correction ignition point acting in a retard direction after a predetermined intake tube pressure change has been exceeded, and
    adjusting the correction ignition point within a freely selectable time in an advance direction to the valid characteristic-diagram ignition point,
    wherein the correction ignition point is a function of the engine speed.

3. Method according to claim 1, wherein the correction ignition point is a function of the engine speed.

* * * * *